United States Patent
Arora et al.

(10) Patent No.: US 11,165,780 B2
(45) Date of Patent: Nov. 2, 2021

(54) SYSTEMS AND METHODS TO SECURE PUBLICLY-HOSTED CLOUD APPLICATIONS TO RUN ONLY WITHIN THE CONTEXT OF A TRUSTED CLIENT APPLICATION

(71) Applicant: DELL PRODUCTS L.P., Round Rock, TX (US)

(72) Inventors: Mohit Arora, Leander, TX (US); Abu S. Sanaullah, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 252 days.

(21) Appl. No.: 16/201,610

(22) Filed: Nov. 27, 2018

(65) Prior Publication Data

US 2020/0169560 A1 May 28, 2020

(51) Int. Cl.
*H04L 29/06* (2006.01)
*H04L 9/08* (2006.01)
*H04L 9/32* (2006.01)
*G06F 16/958* (2019.01)

(52) U.S. Cl.
CPC .......... *H04L 63/102* (2013.01); *G06F 16/958* (2019.01); *H04L 9/0869* (2013.01); *H04L 9/3247* (2013.01)

(58) Field of Classification Search
CPC ........ G06F 21/10; G06F 21/12; G06F 21/121; G06F 21/128; G06F 21/105; G06F 21/30; G06F 21/44; G06F 21/445; G06F 21/45; G06F 16/958; H04L 63/102; H04L 9/0869; H04L 9/3247

See application file for complete search history.

(56) References Cited

U.S. PATENT DOCUMENTS

| 7,877,461 B1 * | 1/2011 | Rimmer ............ H04M 1/72525 709/217 |
| 10,185,828 B2 | 1/2019 | Vidyadhara et al. |
| 2018/0217940 A1 | 8/2018 | Joshi et al. |
| 2019/0066143 A1 | 2/2019 | Dasar et al. |

OTHER PUBLICATIONS

Microsoft, Magazine, "ASP.Net, Single-Page Applications: Build Modern, Responsive Web Apps With ASP.Net", Printed from Internet Nov. 7, 2018, 32 pgs.
Wikipedia, "Chakra (JavaScript engine)", Printed from Internet Nov. 9, 2018, 2 pgs.

(Continued)

*Primary Examiner* — Edward Zee
(74) *Attorney, Agent, or Firm* — Egan, Enders & Huston LLP.

(57) ABSTRACT

Systems and methods are provided that may be implemented to secure a publicly-hosted web application so that it will render only within the determined context of a trusted client application. Such an authentication decision may be made, for example, using front-end web application code that is rendered in a client web view together with client application code to authenticate the client application context in which the web page is rendered. In this way, the web application may validate that it is being rendered in the context of a trusted and/or well-known client application rendering engine/environment.

20 Claims, 4 Drawing Sheets

(56) References Cited

OTHER PUBLICATIONS

Wikipedia "Chakra (Jscript engine)", Printed from Internet Nov. 9, 2018, 3 pgs.
NIST, Information Technology Laboratory, Computer Security Resource Center, "cryptographic token", available from Internet at least as of Nov. 9, 2018, 1 pg.
Wikipedia, "Microsoft Edge", Printed from Internet Nov. 7, 2018, 23 pgs.
Microsoft, Windows Dev Center, "What's a Universal Windows Platform (UWP) app?", May 6, 2018, 4 pgs.
Microsoft, Windows Dev Center, "App package manifest", Aug. 6, 2017, 1 pg.
CodeAnalogies Blog, Visual explanations of HTML, CSS and JavaScript concepts, "The Relationship Between HTML, CSS and JavaScript Explained by Building a City", Printed from Internet Nov. 7, 2018, 21 pgs.
Android Developers, "WebView", A. droid Dev Summit, last updated Sep. 12, 2018, 374 pgs.
TechTarget Network, "Android WebView", last updated Apr. 2015, 3 pgs.
How to Geek.Com, "What is Windows RT, and How Is it Different From Windows 8?", printed from Internet Nov. 19, 2018, 11 pgs.
Wikipedia, "Windows RT", Printed from Internet Nov. 7, 2018, 20 pgs.
Wikipedia, "Windows Runtime", Printed from Internet Nov. 12, 2018, 10 pgs.
Windows UWP applications, Microsoft Docs, "Previous app package manifest scheme versions", Aug. 6, 2017, 1 pg.
Windows UWP application, Microsoft Docs, "How to specify extension in a package manifest", Apr. 4, 2017, 4 pgs.
Windows UWP application, Microsoft Docs, "How to specify device capabilities in a package manifest", Apr. 4, 2017, 5 pgs.
Windows UWP application, Microsoft Docs, "How to specify capabilities in a package manifest", Apr. 4, 2017, 2 pgs.
Windows UWP application, Microsoft Docs, "How to create a basic package manifest for Windows 8", Apr. 4, 2017, 5 pgs.
Windows UWP application, Microsoft Docs, "How to create a package manifest manually", Apr. 4, 2017, 2 pgs.
Windows UWP application, Microsoft Docs, "Package manifest schema reference for Windows 10", Apr. 9, 2018, 27 pgs.

* cited by examiner

SYSTEMS AND METHODS TO SECURE PUBLICLY-HOSTED CLOUD APPLICATIONS TO RUN ONLY WITHIN THE CONTEXT OF A TRUSTED CLIENT APPLICATION

FIELD

This invention relates generally to information handling systems and, more particularly, to controlling execution of publicly-hosted cloud applications within a web-view of client applications running on client information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The Microsoft Universal Windows Platform (UWP) provides a common application platform across different types of client information handling systems (e.g., such as desktop PCs, gaming systems, mixed-reality headsets, etc.) that run the Microsoft Windows 10 operating system (OS). The UWP includes core application programming interfaces (APIs) that are the same on all devices that run the Windows 10 OS, and UWP applications that only require the core UWP APIs will run on any Windows 10 device. UWP applications are made available to end users from the Microsoft Store.

Integration of server-hosted web content and local client information handling system content is becoming increasingly common. There are many cases in which a cloud-hosted website application (web application) executing on a web server needs to be rendered in a web view within the UWP application. Since web applications are public facing, any human user, web crawler or malicious actor can interact via the Internet with the server-hosted web application which could lead to vulnerabilities such as the disclosure and/or tampering of sensitive application data on the server. Traditional authentication mechanisms (e.g., such as user-name/password, application programing interface "API" Keys, session tokens, etc.) require the human end user to login to the web application with credentials. However, these traditional authentication methods are limited to web applications that are human user-account based and do not lend themselves to UWP applications that need to allow all human end users to interact with a server-hosted web application when it is rendered within a UWP application executing on a particular client information handling system.

UWP applications may execute on a client system to expose local custom application programming interfaces (APIs) and Windows APIs to be accessed by web views using UWP application content URL rules (ACURs) so as to limit the access of local APIs to a pre-defined and hard-coded URL.

SUMMARY

Disclosed herein are systems and methods that may be implemented to secure a publicly-hosted cloud website application (i.e., web application) so that it will render only within a trusted client application (e.g., such as a trusted Universal Windows Platform (UWP) application) that is executed by particular client information handling system, such as a desktop or tower personal computer (PC), laptop or notebook computer, gaming systems, mixed-reality headset, etc. In one embodiment, the context in which a web server-hosted web application is to be executed and rendered as a front-end web page within a web view of a client application may be determined and used to authorize and allow the web application to execute and render within the web-view. Such an authentication decision may be made, for example, using front-end web application code (e.g., JavaScript) that is rendered in the client web-view together with client application code (e.g., Microsoft Windows operating system APIs) to authenticate the client application context in which the web-page is rendered. In this way, the web application may validate that it is being rendered in the context of a trusted and/or well-known client application rendering engine/environment, e.g., such as an authorized UWP application. This is in contrast to conventional publicly-hosted web applications which can be accessed by any client information handling system browser or application regardless of context, unless the web application is protected by a human user-specific login and password.

In one embodiment, authorization to allow a publicly-hosted web application to be rendered within an application web-view on a client information handling system may be advantageously limited to only specific authorized client applications, e.g., such as only those UWP or and/or other client applications that are listed by hard-coded identifier (ID) or included within a whitelist (or not included in a blacklist) provided from or created from information from the Microsoft store or from other approved source's of the client application. In this way access to the publicly-hosted web application may be limited on the basis of the client hardware platform executing the client application, regardless of the identity of the human user that is operating the client information handling system. For example, many factory-installed client applications on a client information handling system do not require a human end user to login to the client application itself to provide full functionality. However, many of these client application/s render manufacturer-hosted web applications within web-views on the client information handling system to provide enhanced functionality such as device registration and warranty transfer, which is directly tied to the client information handling system itself and not tied to the human end user. In such a case, access to the web application/s hosted by the manufacturer's server may only be allowed for trusted client-executed client applications executing on particular types of information handling systems, while access to the manufacturer-hosted web application/s is denied to standard web browsers and untrusted client applications executing on any client information handling system.

In one respect, disclosed herein is a method, including: launching and executing a client application on a first information handling system, the client application communicating a first request across a network to a second information handling system for a web page of a web application from the second information handling system; transferring a first portion of the web application across the network from the second information handling system to the first information handling system in response to the first client application request, the transferred first portion of the web application including authorization information; and executing the transferred first portion of the web application within the client application on the first information handling system without first fully rendering the requested web page to: obtain identity information of the client application from client application logic executing on the first information handling system, the identity information of the client application being stored on the first information handling system, compare the identity information of the client application to the authorization information to determine whether or not the client application is authorized to fully render the web page, and fully render the requested web page within the client application on a display device only if the client application is determined from the comparison to be authorized to fully render the web page.

In another respect, disclosed herein is a system, including: a first information handling system and a second information handling system; where the first information handling system includes a programmable integrated circuit executing to transfer a first portion of a web application across the network to a second information handling system in response to a first request for a web page received across the network from a client application executing on the second information handling system, the transferred first portion of the web application including authorization information; and where the second information handling system includes a display device and a programmable integrated circuit coupled to the display device, the programmable integrated circuit of the second information handling system executing the first portion of the web application within the client application on the second information handling system and without first fully rendering the requested web page to: obtain identity information of the client application from client application logic executing on the first information handling system, the identity information of the client application being stored on the first information handling system, compare the identity information of the client application to the authorization information to determine whether or not the client application is authorized to fully render the web page, and fully render the requested web page within the client application on the display device of the second information handling system only if the client application is determined from the comparison to be authorized to fully render the web page.

DESCRIPTION OF ILLUSTRATIVE EMBODIMENTS

Figure 1:
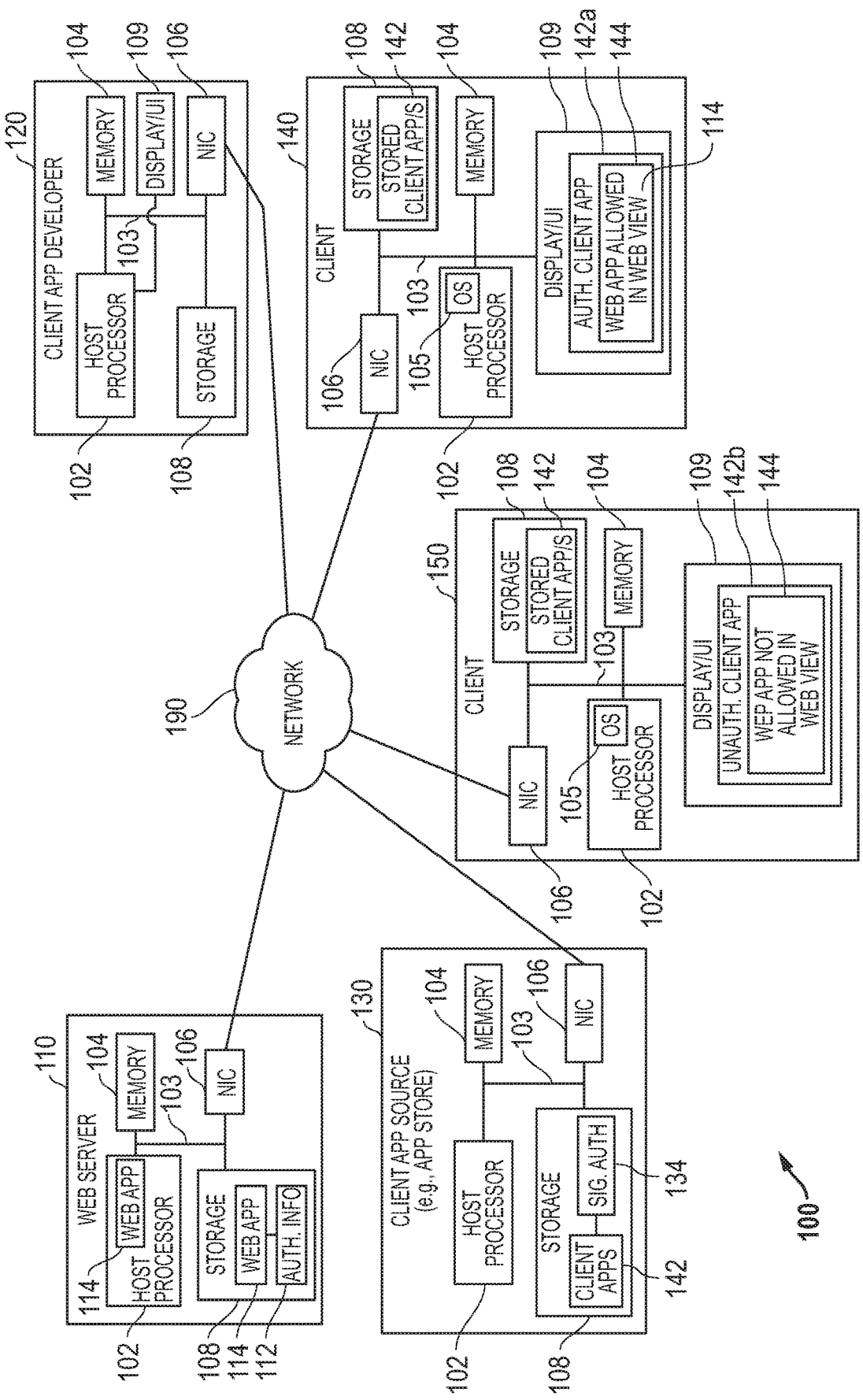
FIG. 1 illustrates a network architecture according to one exemplary embodiment of the disclosed systems and methods.

FIG. 1 illustrates one exemplary embodiment of a network architecture 100 that includes multiple information handling systems 110, 120, 130, 140 and 150 that are in communication (e.g., via TCP/IP or Internet protocol) with each other across a public network 190, such as the Internet. In this embodiment, system 110 is a web server that is configured to serve at least one web application (web app) 114 across network 190 to systems 140 and 150 that are each configured as a non-mobile desktop or tower computer that execute client applications 142a and 142b (e.g., UWP applications), respectively. However, it will be understood that in other embodiments, the disclosed systems and methods may be implemented to secure publicly-hosted web applications to run in trusted client application contexts that are implemented on mobile systems, e.g., such as notebook or laptop computers, tablet computers, smart phones, etc. Moreover, in other network architectures, any other number of one or more client systems may be similarly hosted by one or more web servers across a network 190.

In FIG. 1, each of systems 110, 120, 130, 140 and 150 includes at least one host processing device 102 (e.g., AMD or Intel-based CPU such as Itanium or any other type of suitable host processing device), one or more buses or communication media 103 (e.g., PCIe bus, USB, SMBus, SATA, other appropriate data buses such as memory bus, etc.), non-volatile storage 108 (e.g., hard drive/s, solid state drive/s "SSDs" and or other non-volatile memory), and system volatile memory (e.g., DRAM) 104. The host processing device/s 102 of client systems 140 and 150 each execute a host operating system (OS) 105 (e.g., Microsoft Windows-based OS, Linux-based OS, Android OS, iOS, etc.). Bus/es 103 provides a mechanism for the various components of system 204 to communicate and couple with one another. Each of systems 110, 120, 130, 140 and 150 may be provided as shown with a network interface card (NIC) 106 that is communicatively coupled to network 190 to allow various components of each systems 110, 120, 130, 140 and 150 to communicate through NIC 106 with components of other information handling systems across network 190.

As further shown in FIG. 1, client systems 140 and 150 may include video display device (e.g., LCD display, LED display, etc.) and user interface (UI) component/s 109 that may be optionally integrated into one component (e.g., LCD or LED display touchscreen device) for displaying information to human users and for receiving user input from human users and/or may include separate video display and input/output (I/O) components (e.g., mouse, keyboard, etc.) for performing the same functions. Display/UI component/s 109 may be coupled to bus 103 and/or directly to host processing device 102 as shown, depending on the particular configuration of the given system (e.g., coupled directly to integrated graphics of a host processing device 102 and/or separately coupled via bus 103 to provide user input signals to host processing device 102 through other components and/or to receive video information from a graphics processor unit "GPU").

As shown, each of client systems 140 and 150 may be configured to obtain one or more client applications 142 across network 190 from storage 108 of client application source 130 (e.g., such as an application store), and to save them to storage 108 for future access. A client application 142 may then be retrieved from storage 108 and selectively launched and executed by host processing device 102 of each of systems 140 and 150 to display as shown on display device of component/s 109 of the respective system. Such an executing client application 142 may also implement a web view browser 144 within the client application 142 to attempt to display a requested web application 114 that has been served by web server 110 across network 190.

As described further herein, web server 110 may execute back end code of web application 114 on its host processing device 102, and to maintain authorization information 112. Authorization information 112 may be, for example, a dynamic and updateable whitelist or a static (non-updateable) hard coded identifier of client application/s 142 that are authorized to render the front end code of web application 114 as a web-page within a web-view of the client application, or may be a blacklist or hard coded identifier of client application/s 142 that are not authorized to render the front end code of web application 114 as a web-page within a web-view of the client application. In one embodiment, particular client applications 142 may be identified as authorized by the authorization information 112 based on characteristics of signature authority information 134 (e.g., in the form of a Microsoft Store Signature) that is maintained by client application source 130 for each client application 142.

In FIG. 1, client system 140 is shown executing an authorized client application 142*a* that is allowed based on its identification in authorization information 112 as being authorized to render web page/s from web application 114 within a web-view of the authorized client application 142*a*. However, client system 150 is shown executing an unauthorized client application 142*b* that is not identified as being authorized by authorization information 112 and is therefore not allowed to render web application 114 as a web-page within a web-view of the unauthorized client application 142*b*. It will be understood that type/s of authorization information 112 may be employed that is suitable for restricting the type and/or identity of client applications that are allowed to render web application as a web view, e.g., such as whitelist of the identities of authorized publisher/s of client application/s 142, hard coded identification of identities of authorized publisher/s of client application/s 142, blacklist of identities of non-authorized publisher/s of client application/s 142, etc.

It will be understood that FIG. 1 is exemplary only, and that the disclosed systems and methods may be implemented with other network configurations and configurations of information handling systems that each may include fewer, additional and/or alternative hardware and/or software/firmware components as well as any type/s of processing devices suitable implementing the disclosed systems and methods such as central processing units (CPUs), embedded controllers, keyboard controllers, microcontrollers, application specific integrated circuits (ASICs), field programmable gate arrays (FPGAs), etc. Moreover, in some embodiments, a web server 110 may also components such as baseboard management controller (BMC) and/or remote access controller (RAC) having one or more out-of-band processing devices and non-volatile memory (e.g., embedded and partitioned flash memory, Electrically Erasable Programmable Read Only Memory—EEPROM, other types of non-volatile random access memory "NVRAM", etc.) that stores remote access controller component firmware 207. Examples of such a remote access controller include an integrated Dell Remote Access Controller (iDRAC) available from Dell Technologies Inc. of Round Rock, Tex., etc.). Further information on possible configuration and operation of servers, clients, and network communications between the same may be found in United States Patent Application Publication 2017/0270301, and in U.S. patent application Ser. No. 15/691,325 filed Aug. 30, 2017, each of which is incorporated herein by reference its entirety for all purposes.

Figure 2:
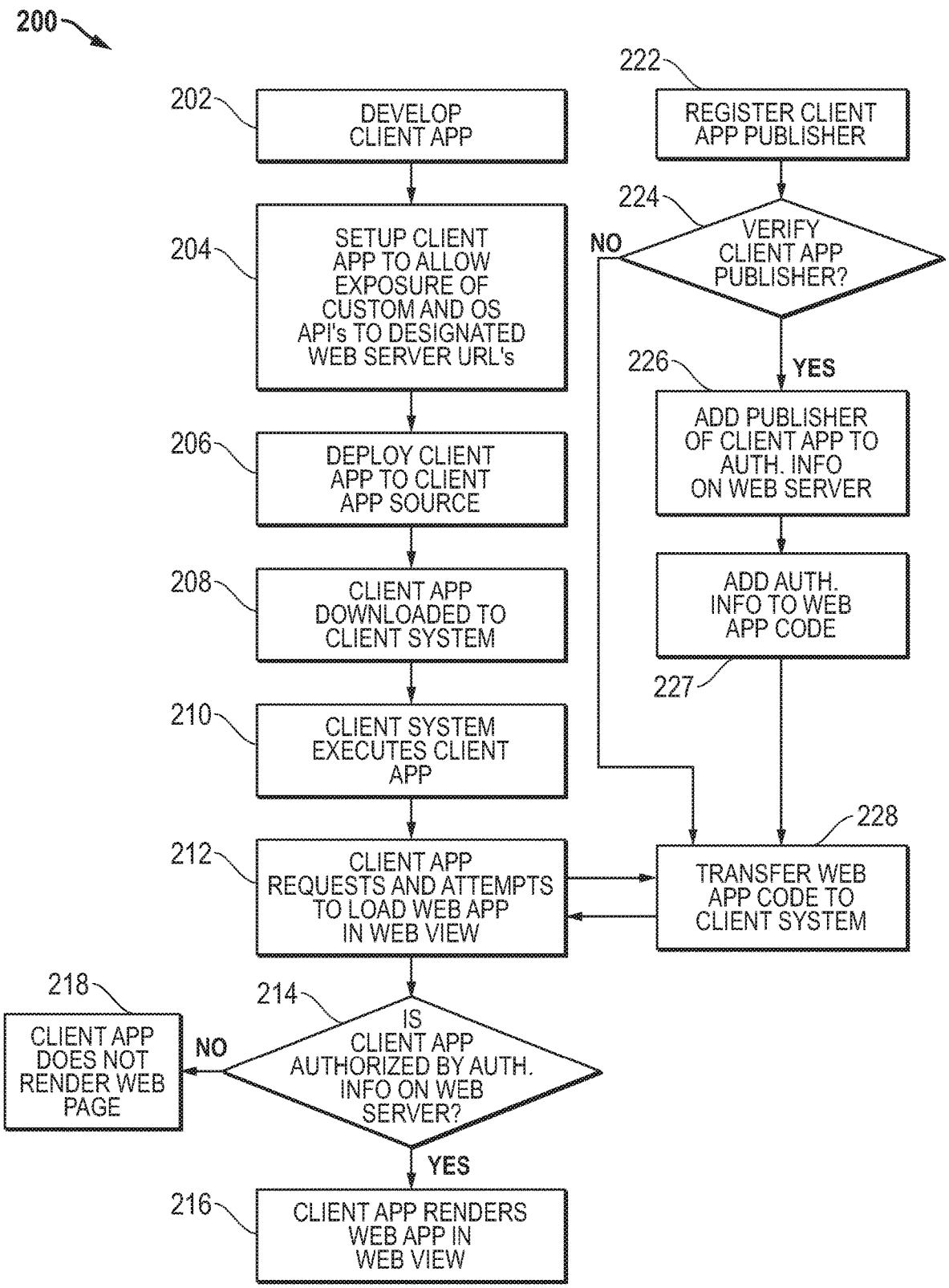
FIG. 2 illustrates methodology according to one exemplary embodiment of the disclosed systems and methods.

FIG. 2 illustrates methodology 200 that may be implemented according to one exemplary embodiment to secure a publicly-hosted web application 114 so that it will render only within a trusted rendering client application 142*a* that is executed by a particular client information handling system 140. For purposes of illustration, FIG. 2 is described herein in relation to the network architecture embodiment 100 of FIG. 1, it being understood that methodology 200 may be employed with other network architecture embodiments, e.g., having different numbers and/or types of information handling systems, different types and/or number of client applications, different numbers and/or types of network applications, etc.

As shown in FIG. 2, methodology 200 begins in step 202, where a client application 142*a* or 142*b* that includes web-view capability for rendering a web application web pages is developed (i.e., written and coded) by an application developer. Client application 142*a* or 142*b* may be, for example, a Microsoft Universal Windows Platform (UWP) application programmed to execute within a Microsoft OS environment, an Android web application programmed to execute within an Android OS environment, or other type of web-view-enabled application programmed to operate in Linux OS or iOS OS, etc.

Next, in step 204, the application package manifest of client application 142*a* or 142*b* is set up by an application developer (e.g., on client application developer system 120) to allow exposure of custom and operating system (OS) APIs executing on a client system (e.g., such as client systems 140 and 150) to a designated web application 114 that is available to client systems across network 190 from a website domain hosted by web server 110. Such an application package manifest may be a Windows 10 UWP application component that contains information needed to deploy, display, or update a client application 142 (such as package identity, package dependencies, required capabilities, visual elements, extensibility points, etc.), and is digitally signed as part of signing the application package. After installation, the application package manifest file appears in the directory for the installed application package.

Website domain of web server 110 may be, for example, a website domain for a manufacturer of client systems 140 and 150, in which case web application 114 may be programmed to implement registration of an individual client system 140 and 150 with the system manufacturer, as well as to enable system warranty transfer to a human user (e.g., purchaser) of the respective client systems 140 and 150. Each client application 142*a* and 142*b* may in one embodiment be set up to allow exposure of custom and OS APIs to web application 114 to the JavaScript running inside the web view by, for example, declaring a capability that is defined in the Windows application manifest file which enables access to any interfaces/API that is within a Windows Runtime (WinRT) library that is referenced in the client application 142. As an example, given a Windows 10 OS environment, client applications 142*a* and 142*b* may be set up in such a way to allow exposure of Windows Runtime (WinRT) APIs and custom Windows APIs to code of web application 114 when launched and executing on host processing device 102 of a client system 140. In this regard, WinRT is a platform agnostic application architecture used within Windows 10 (and starting with Windows 8). Custom Windows APIs may accomplish any task the web view JavaScript wants, and may be an interface to call into the client code from the web view JavaScript, e.g., to get the current client application version. It may also be any interface that is written to return a value or perform some action, etc.

Next, in step 206, client application 142a or 142b is published and deployed from client application developer system 120 across network 190 to client application source 130 (e.g., such as Microsoft Store or other repository of available client applications), where the client application is stored on storage 142a or 142b together with signature authority information 134 that cryptographically signs and verifies the identity of the publisher of the client application 142a, but in this case does not so verify the identity of the publisher of the client application 142b. Client application 142a or 142b is now available to be downloaded to client systems across network 190. In this example, client application 142a or 142b is downloaded in step 208 together with its publisher identification information to client system 140 or 150 as the case may be. It will be understood that the identity of the publisher of a given client application 142 may be the same as the developer of that given client application, and/or may be any other entity (e.g., human, company, corporation, etc.) that is responsible for distributing the given client application 142 to client application source 130. It will also be understood that in other embodiments authorization information 112 may alternatively be any other information that corresponds to a given client application 142, e.g., such as identity of developer/s of a client application 142 (where client application developer is different from client application publisher), identity of particular authorized client application/s 142, etc.

Step 208 may occur, for example, in response to a request submitted from client system 140 or 150 to client application source 130 by a human user operating client system 140/150, e.g., such as purchase or free download of client application 142a or 142b from the client application source 130. Alternatively, such a request may be automatically submitted system software or firmware that executes on host processing device 102 of client system 140/150, e.g., by system manufacturer-loaded software or firmware upon initial power on and system setup of client information handling system 140/150 by a human end user. After step 208, client application 142a or 142b is ready to be launched and executed on host processing device 102 of client system 140 or 150 in step 210, e.g., when launched by a human user 302 as illustrated further herein in regard to FIGS. 3 and 4. When so launched, client application 142a or 142b requests and attempts to load web application 114 across network 190 from web server 110 in step 212 as shown.

Still referring to FIG. 2, steps 222 through 226 of methodology 200 are performed prior to attempted loading of web application 114 in step 212. In step 222, the publisher of client application 142a or 142b is registered on web server 110 before performing a verification step 224 that determines whether the particular client application 142a or 142b is authorized by authorization information 112 (e.g., is added to a white list, is identified by hard coding ID, is not added to a blacklist, etc.) maintained on web server 110. In this regard, steps 222 through 226 may be performed, for example, by web server administrative personnel and/or by automated server firmware/software executing on host processing device 102 of web server 110 and/or other systems, etc. In one example of step 222, the publisher of a client application 142a or 142b may in one embodiment be manually registered on web server 110 by steps in which an owner or operator of the client application developer system 120 that is the source of the client application 142a may manually request that the publisher of the client application 142a be added to an authorized client application whitelist or other authorization information 112 maintained on the web server system 110. The publisher of the given client application 142a or 142b may then be verified (or not verified) across network 190 in step 224 by querying the custom APIs for the particular client application's publisher to confirm that the publisher is cryptographically signed by signature authority information 134 on the client application source 130.

If the publisher of a client application (in this example, client application 142a) is verified in step 224, then methodology 200 proceeds to 226 where the verified publisher of the now-authorized client application 142a is indicated to be authorized (e.g., added to a whitelist, or removed from a blacklist) by authorization information 112 maintained in storage 108 of web server system 110. However, where a client application publisher is not verified in step 224 (e.g., the publisher is not cryptographically signed by signature authority information 134 on the client application source 130), then the publisher of the now non-authorized client application (in this example, client application 142b) is not indicated to be authorized (e.g., not added to a whitelist, or added to a blacklist) by the web server authorization information 112 and methodology 200 instead skips directly to step 228 for client application 142b. In one embodiment authorization information 112 may be a whitelist on web server system 110 that includes one or more verified publishers and may be added to or expanded over time to include new publishers as they are verified in separate instances of step 224.

In the case where the publisher of a given authorized client application 142a is indicated to be authorized by a whitelist in step 226, then identification information (e.g., name or identification code corresponding to the verified publisher of the given authorized client application 142a) is added to or otherwise linked as part of the whitelist information in step 227 to the software code (e.g., a combination of hypertext markup language "HTML", cascading style sheets "CSS", and JavaScript code) of one or more web application/s 114 maintained on storage 108 of web server 110. As previously described, other types of authorization information 112 besides a whitelist may be employed and linked in similar manner to the software code of web application/s 114 maintained on storage 108 of web server 110.

Returning now to step 212 of FIG. 2, when a current client application 142 (e.g., authorized client application 142a or unauthorized client application 142b) that is executing on a host processing device 102 of a client system 140 or 150 requests a particular web application 114 across network 190 from web server 110, the host processing device 102 of the web server 110 responds in step 228 by transferring web application code (e.g., HTML, CSS and JavaScript code) of the particular requested web application 114 (together with the previously-described authorization information 112 of step 227) to the requesting client system 140 across network 190. As further illustrated and described in relation to FIGS. 3 and 4, this code of web application 114 may be programmed to execute on client system 140 or 150 together with the launched client application 142 to perform step 214 of FIG. 2, i.e., to determine whether a particular launched and executed client application 142a or 142b is authorized by authorization information 112 to render the requested web application 114 in web view 144 on client system 140 or 150. If so authorized, the client application 142 renders the requested web application 114 in web view 144 during step 216. If not so authorized, the client application 142 does not render the requested web application 114 in web view 144. Thus, in the case of the exemplary embodiment of FIG. 1, authorized client application 142a would be allowed to render the requested web application in web view 144 on client system 140, while unauthorized client application 142b would not be allowed to render the requested web application in web view 144 on client system 150.

Figure 3:
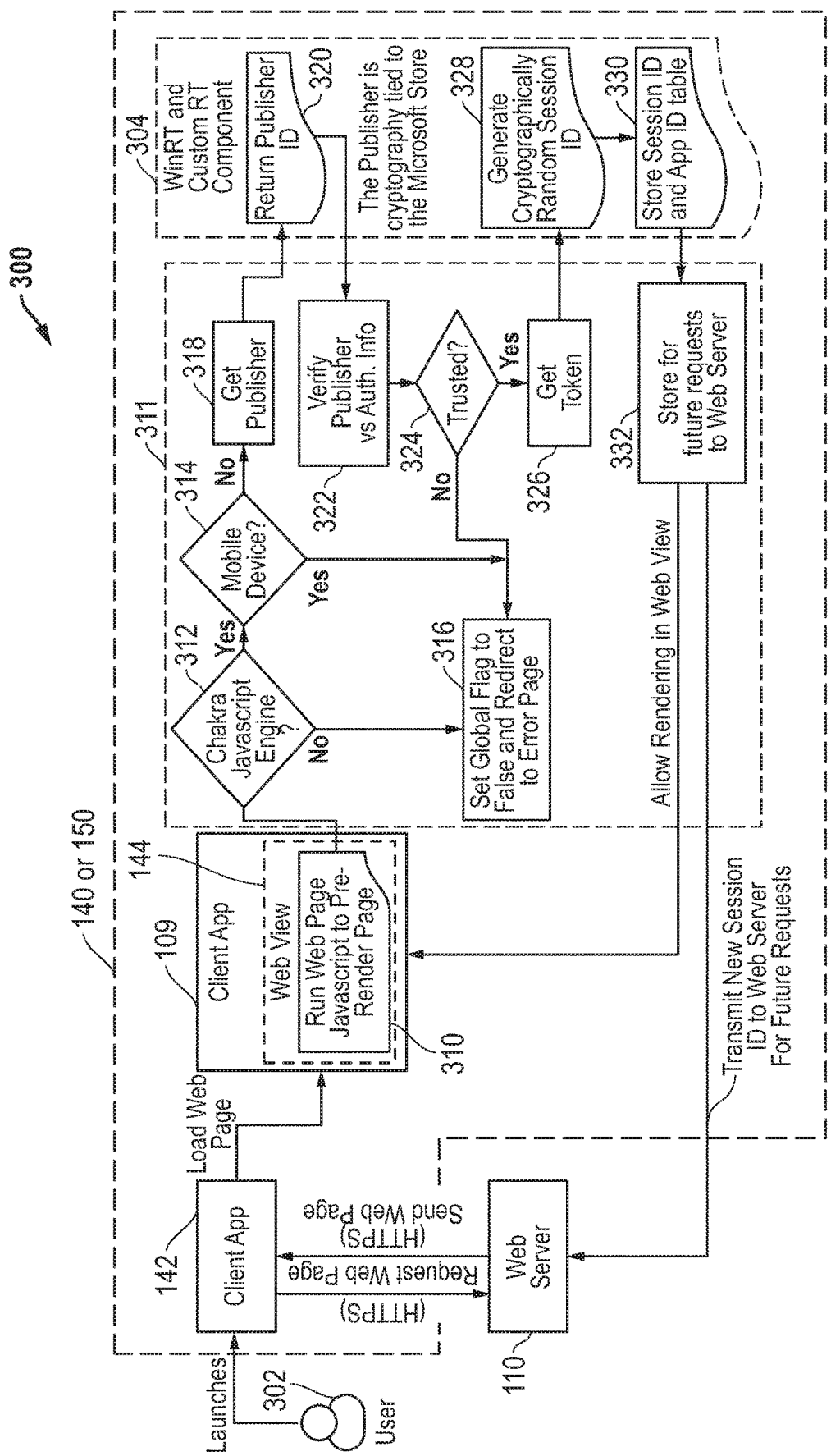
FIG. 3 illustrates process flow according to one exemplary embodiment of the disclosed systems and methods.

FIG. 3 illustrates one exemplary embodiment of a detailed process flow for launching and authenticating a client application 142 for rendering a requested web application 114 in web view 144 during web session creation between web server 110 and a client information handling system 140 or 150. In this embodiment, web application 114 may be a warranty transfer and registration application for a desktop or tower computer system. Thus, in FIG. 3, authentication is limited to only those desktop or tower client systems that execute a client application 142 that uses a Microsoft Chakra JavaScript engine on a Microsoft Edge Browser, i.e., to limit rendering of the web application 114 on desktop computer systems implementing a Microsoft Chakra Edge Browser and not on any mobile computing device or mobile information handling system. However, the disclosed systems and methods may be implemented for authenticating client applications for rendering other types of web applications (e.g., non-warranty or registration web applications) on other types of systems (e.g., including mobile information handling systems such as tablet computers, notebook computers, smart phones, convertible computers, etc.) running other types of browser software.

As shown in FIG. 3, when human user 302 launches client application 142 on host processing device 102 of a client system 140 or 150, the launched and executing client application 142 responds by initiating a request (e.g., via URL over a secure HTTPS connection) for a web page of web application 114 from web server 110 across network 190. In one embodiment, the web application 114 may be a single page application (SPA) programmed to load a single HTML web page, and to execute JavaScript and CSS on the client system to dynamically update the webpage in response to further input from user 302 with or without reloading the web page or transferring additional HTML code from web server 110. The web server 110 may respond to the web page request by sending HTML, CSS and JavaScript of the web application 114 (together with authorization information 112) corresponding to the requested web page to the executing client application 142 across network 190. The requested web application 114 then loads and uses its JavaScript code to prerender the requested web page 310 as a static web page in web view 144 of the executing client application 142 on display device of component/s 109 of the client system. At this time, the JavaScript of the prerendered static web page 310 is not enabled to update or otherwise alter the prerendered web page 310 with additional data from web server 110 in response to input from user 302, e.g., that is provided by the user via I/O devices of the client system such as mouse, keyboard, touch pad, touch screen, etc.

As shown in FIG. 3, before allowing full rendering of the web page 310 as a dynamic web page, front end JavaScript of the web application 114 performs user interface and client application authorization methodology 311 for a new web session (i.e., no pre-existing web session ID exists). In the particular embodiment of FIG. 3, authorization methodology 311 first determines in step 312 whether the web view engine of the current client application 114 is not a UWP application running a Microsoft Chakra Edge browser. In step 314, authorization methodology 311 determines if the current client system 140 or 150 is a mobile device (e.g., notebook computer, smart phone, tablet computer, convertible computer, etc.). If either is the case, then a global flag in the JavaScript (i.e., which has global scope such that all scripts and functions on a web page can access it) is set to false in step 316 and the JavaScript of the web application 114 redirects to an error page is displayed to the user 302 on display device of component/s 109 of the client system. In this case, steps of methodology 311 terminate without ever rendering any content of the requested web page 310 as a dynamic web page within web view 144, e.g., successfully preventing malicious and unauthorized actors to view/interact with the web application 114 outside the context of an authorized client application 142a. It will be understood that steps 312 and 314 are optional to filter out non-UWP client applications and mobile devices. However, in other embodiments methodology 311 may proceed directly to step 318 described below (i.e., without intervening steps 312 and/or 314).

Still referring to FIG. 3, if the client application 142 is a UWP application executing a Microsoft Chakra Edge browser and is not a mobile device, then authorization methodology 311 proceeds to step 318, where the web application JavaScript requests identity information of the publisher of the executing client application 142 (e.g., a UWP application) from client application logic 304 of the executing client application 142, e.g., in this case Windows Runtime (WinRT) APIs and Custom RT APIs of the client application 114 as shown. In this regard, client application 142 may execute to expose local custom APIs and WinRT APIs to allow them to be accessed by web-view 144, e.g., using UWP application Content URL Rules (ACURs) that limit the access of local APIs to pre-defined and hard-coded URL/s of remote system resources.

Client application logic 304 responds as shown in step 320 by returning identity information (e.g., name or identification code corresponding to the publisher of the given client application cryptographically tied to client application source 130) via the hard-coded URL and ACURs to the executing JavaScript of the web application 114 of the web view 144. In step 322, JavaScript of authorization methodology 311 then verifies the publisher of the launched client application 142 versus the authorization information 112 that is included in the code of the currently loaded web application 114, e.g., by determining if the identification information of the publisher of the current client application 142 is listed as being authorized by a whitelist or hard code ID, or is listed as being unauthorized in a blacklist or by a hard code ID, etc. Based on this verification, methodology 311 then determines in step 324 if the currently-launched client application 142 is trusted and therefore an authorized client application to render web page 310 of the web application 114 in web view 144. If not, then methodology 311 proceeds to step 316 which is performed as previously described. This would occur, for example, in the case of client information handling system 150 of FIG. 1 which is executing a launched unauthorized application 142b.

However, if it is determined in step 324 of FIG. 3 that the currently-launched client application 142a on client system 140 is trusted (and therefore an authorized client application), then methodology 311 proceeds to step 326 where the executing JavaScript of the web application 114 requests a cryptographic token (i.e., a token where the secret is a cryptographic key) from client application logic 304 of the executing client application 142a. Client application logic 304 responds to this request first in step 328 by creating a cryptographically random session identifier (ID) to use in all future requests made to the backend of web application 114 on web server 110, and then in step 330 storing this created session ID in an application ID table or other data structure that is maintained in volatile system memory 104 for the current web session on the current client system 140. Client application logic 304 then provides the created session ID of step 328 to JavaScript of the web application 114, which in turn stores the created session ID during step 332 in a JavaScript variable that has global scope (i.e., all scripts and function on the web page can access it) for transmission to web server 110 (e.g., as cookie, URL, etc.) as part of future requests to the web server 110 that are made during the same current web session.

In step 332, the client system 140 executing the authorized client application 142a connects to the backend of web application 114 on web server 110 using the session ID provided by the web page/web application front end code 311 in step 332 to "authenticate" on the given interface URL. Specifically, the session ID is transmitted to web server 110 at this time where the web server 110 stores the session ID (e.g., in system memory 104 of web server 110) for future authentication of requests made by the client application 142a during the same web session. Once so "authenticated" the client system 140 will be allowed to use any interface that the web server 110 exposes, and all future updates from the backend web application 114 on web server 110, and transfer of sensitive data between the exposed APIs from the client application context with the web page are both secured. In a further embodiment, an additional step may be added to provide access control list (ACL) control on the interfaces to provide another level of security if desired. In any case, full dynamic rendering of the web page 310 in web view 144 is now allowed at this time, meaning that JavaScript on the displayed web page 310 is now enabled to update or otherwise alter the prerendered web page 310 in response to input received from user 302, e.g., provided via I/O devices of the client system such as mouse, keyboard, touch pad, touch screen, etc.

Figure 4:
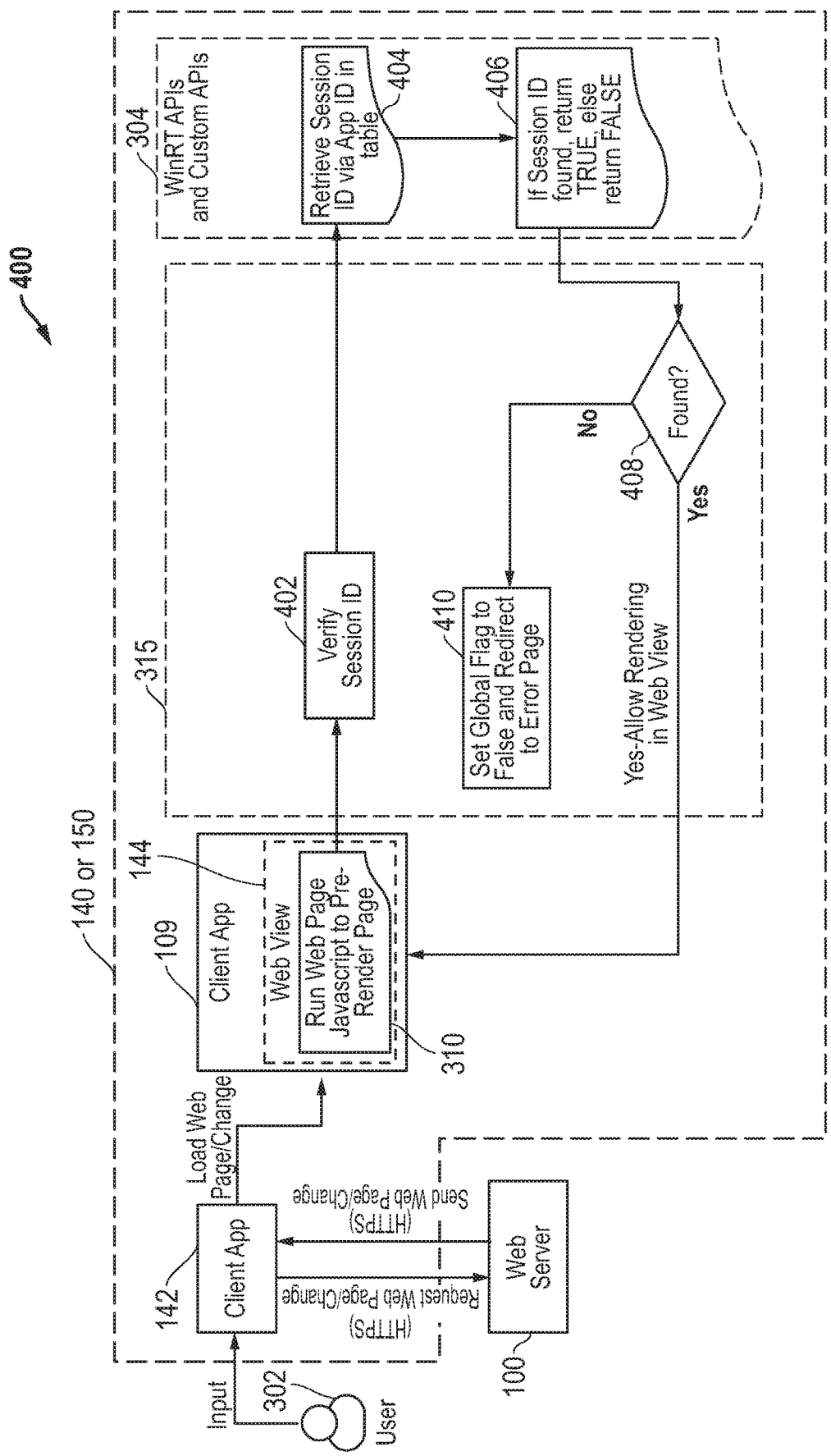
FIG. 4 illustrates process flow according to one exemplary embodiment of the disclosed systems and methods.

FIG. 4 illustrates one exemplary embodiment of a detailed process flow for authenticating a user-request for loading a new web page or for a change to a web page 310 that is already displayed in web view 144 during an existing web session on a client system 140, such as is the case after completion of step 216 of FIG. 2 and step 332 of FIG. 3. As shown in FIG. 4, human user 302 provides input requesting the new web page or web page change to launched and executing client application 142 (e.g., by clicking a link or particular portion of the dynamically rendered web page 310 displayed in web view 144). In response to this user input, client application 142 responds by requesting (e.g., using HTTPS request) the new web page or update/s to the existing web page 310 across network 190 from backend code of web application 114 that is executing on web server 110. The web server 110 may respond to the web page request by sending HTML, CSS and JavaScript updates or a new web page corresponding to the latest user request to the executing client application 142 across network 190. At this time, the web server 110 also provides the previously stored session ID (e.g., from step 332 of FIG. 3) to the client application 142 across network 190. The frontend of web application 114 executing on the client system 140 then loads and uses its JavaScript code to prerender the requested web page changes or new web page as a static web page in web view 144 of the executing client application 142 on display device of component/s 109 of the client system.

Next, as shown in FIG. 4, before allowing full dynamic rendering of the requested web page changes or new web page 310, frontend JavaScript of the web application 114 performs client application authorization methodology 315 for an existing web session (i.e., a pre-existing session ID exists). As shown in FIG. 4, step 402 of authorization methodology 315 provides the existing session ID received from web server 110 to client application logic 304 of the executing client application 142 for verification. Client application logic 304 responds as shown in step 404 by retrieving any current session ID (e.g., previously stored in step 330 of FIG. 3) from client system memory 104, and then in step 406 compares any retrieved session ID from client system memory 104 with the session ID provided by the web server 110 to determine if these session ID values match. If so, client application logic 304 provides a TRUE value to frontend JavaScript 315 of the web application 114 which responds in step 408 by allowing transfer and full dynamic rendering of the requested web page updates or new web page 310 from web server 110 for rending in web view 144. However, if a retrieved session ID from client system memory 104 does not match the session ID provided by the web server 110, or if no pre-existing session ID is found in system memory 104 of the client system 142, then client application logic 304 provides a FALSE value to frontend JavaScript 315 of the web application 114 which responds in step 410 by setting a global flag to false and displaying an error page to the user 302 on display device of component/s 109. In this case, steps of methodology 315 terminate without transfer and dynamic rendering of the requested web page update or new web page 310.

It will be understood that the methodology of FIGS. 3 and 4 may be optionally performed in one embodiment without requiring human user 302 to enter any login information (or to otherwise present user credentials such as ID and password) to the web application 114 and/or client application 142. Thus, such an embodiment may be advantageously implemented to make an authorization decision as to whether to allow a client application 142 to render a web application 114 within web-view 144 on a client system 140 or 150 based on characteristics of the client system itself and not on characteristics (e.g., credentials) of the human end user 302. However, it is alternatively possible that user characteristics (e.g. such as user ID and password) may be also be required for authorizing a client application 142 to render a web application 114.

It will also be understood that methodologies 3 and 4 are exemplary only, and that any combination of fewer, additional and/or alternative steps may be employed that are suitable for determining whether or not to authorize and allow a given web application to execute and render as a web page within a web-view of a client application based on a determined client application context (e.g., identity of the client application) in which the web application is to be executed and rendered as a web-page.

It will be understood that one or more of the tasks, functions, or methodologies described herein (e.g., including those described herein for components 102, 104, 106, 108, 109, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions is configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus, the invention is not limited to only those combinations shown herein, but rather may include other combinations.

What is claimed is:

1. A method, comprising:
    launching and executing a client application on a first information handling system, the client application communicating a first request across a network to a second information handling system for a web page of a web application from the second information handling system;
    transferring a first portion of the web application across the network from the second information handling system to the first information handling system in response to the first client application request, the transferred first portion of the web application including authorization information; and
    first executing the transferred first portion of the web application within the client application on the first information handling system to:
        prerender the requested webpage on a display device as a static webpage that is not enabled to be altered in response to input from a user of the first information handling system,
        obtain identity information of the client application from client application logic executing on the first information handling system, the identity information of the client application being stored on the first information handling system, and
        compare the identity information of the client application to the authorization information to determine whether or not the client application is authorized to fully render the web page as a dynamic webpage; and
    then executing the transferred first portion of the web application within the client application on the first information handling system to fully render the requested web page as a dynamic webpage within the client application on the display device only if the client application is determined from the comparison to be authorized to fully render the web page, the fully rendered dynamic webpage being enabled to be altered in response to input from the user of the first information handling system.

2. The method of claim 1, further comprising displaying an error message on the display device and not fully rendering the requested web page as the dynamic web page only if the client application is determined from the comparison not to be authorized to fully render the web page.

3. The method of claim 1, where the identity information of the client application comprises an identity of the developer or publisher the client application.

4. The method of claim 3, further comprising downloading the client application from the second information handling system across a network to non-volatile storage of the first information handling system prior to launching and executing the client application on the first information handling system.

5. The method of claim 1, where the authorization information comprises at least one of a whitelist, hard-coded identifier, or a blacklist.

6. The method of claim 1, where the client application is a Universal Windows Platform (UWP) application; and where the client application logic executing on the first information handling system and from which the identity information of the client application is obtained comprises one or more Windows Runtime (WinRT) application programming interface/s (APIs).

7. The method of claim 1, where the first information handling system is a desktop or tower computer, where the second information handling system is a web server, and where the network comprises the Internet.

8. A method, comprising:
launching and executing a client application on a first information handling system, the client application communicating a first request across a network to a second information handling system for a web page of a web application from the second information handling system;
transferring a first portion of the web application across the network from the second information handling system to the first information handling system in response to the first client application request, the transferred first portion of the web application including authorization information; and
executing the transferred first portion of the web application within the client application on the first information handling system without first fully rendering the requested web page to:
obtain identity information of the client application from client application logic executing on the first information handling system, the identity information of the client application being stored on the first information handling system,
compare the identity information of the client application to the authorization information to determine whether or not the client application is authorized to fully render the web page, and
fully render the requested web page within the client application on a display device only if the client application is determined from the comparison to be authorized to fully render the web page;
where the identity information of the client application comprises an identity of the developer or publisher the client application; and
where the method further comprises:
first determining whether the identity of the developer or publisher of the client application is cryptographically signed by signature authority information stored on a third information handling system, and then creating or editing the authorization information to indicate that the client application is an authorized application for fully rendering the web application only if the identity of the developer or publisher of the client application is determined to be cryptographically signed by signature authority information.

9. A method, comprising:
launching and executing a client application on a first information handling system, the client application communicating a first request across a network to a second information handling system for a web page of a web application from the second information handling system;
transferring a first portion of the web application across the network from the second information handling system to the first information handling system in response to the first client application request, the transferred first portion of the web application including authorization information; and
executing the transferred first portion of the web application within the client application on the first information handling system without first fully rendering the requested web page to:
obtain identity information of the client application from client application logic executing on the first information handling system, the identity information of the client application being stored on the first information handling system,
compare the identity information of the client application to the authorization information to determine whether or not the client application is authorized to fully render the web page, and
fully render the requested web page within the client application on a display device only if the client application is determined from the comparison to be authorized to fully render the web page;
where the method further comprises performing the following steps only if the client application is determined to be authorized to fully render the web page:
executing the client application logic on the first information handling system to generate a cryptographically random session identifier and storing the generated session identifier on the first information handling system,
providing the session identifier across the network to the second information handling system, and
storing the session identifier on the second information handling system.

10. The method of claim 9, further comprising performing the following steps in response to a second client application request communicated across the network to the second information handling system during a same web session as the first client application request, the second client application request comprising a request for a new web page or an update to the previously fully-rendered web page of the same web application from the second information handling system:
transferring a second portion of the web application from the second information handling system to the first information handling system in response to the second client application request, the transferred first portion of the web application including the previously-generated session identifier;
executing the transferred second portion of the web application within the client application on the first information handling system without fully rendering the requested web page update or new web page to provide the previously-generated session identifier received from the second information handling system to the client application logic executing on the first information handling system;
executing the client application logic to:
receive the previously-stored session identifier on the first information handling system,
compare the session identifier stored on the first information handling system to the session identifier received from the second information handling system to determine whether or not the session identifier stored on the first information handling system is the same as the session identifier received from the second information handling system; and
then executing the second portion of the web application within the client application on the first information handling system and without first fully rendering the requested web page to only one of:
fully render the requested web page update or new web page within the client application on the display device only if the session identifier stored on the first information handling system is determined to be the same as the session identifier received from the second information handling system, or display an error message on the display device and not fully rendering the requested web page only if the session identifier stored on the first information handling system is determined not to be the same as the session identifier received from the second information handling system.

11. A system, comprising:

a first information handling system and a second information handling system;

where the first information handling system comprises a programmable integrated circuit executing to transfer a first portion of a web application across a network to a second information handling system in response to a first request for a web page received across the network from a client application executing on the second information handling system, the transferred first portion of the web application including authorization information; and where the second information handling system comprises a display device and a programmable integrated circuit coupled to the display device, the programmable integrated circuit of the second information handling system first executing the first portion of the web application within the client application on the second information handling system to:

prerender the requested webpage on the display device as a static webpage that is not enabled to be altered in response to input from a user of the second information handling system, obtain identity information of the client application from client application logic executing on the first information handling system, the identity information of the client application being stored on the first information handling system, compare the identity information of the client application to the authorization information to determine whether or not the client application is authorized to fully render the web page as a dynamic webpage; and the programmable integrated circuit of the second information handling system then executing the first portion of the web application within the client application on the second information handling system to fully render the requested web page as a dynamic webpage within the client application on the display device of the second information handling system only if the client application is determined from the comparison to be authorized to fully render the web page, the fully rendered dynamic webpage being enabled to be altered in response to input from the user of the second information handling system.

12. The system of claim 11, the programmable integrated circuit of the second information handling system executing the first portion of the web application to display an error message on the display device without fully rendering the requested web page as the dynamic web page only if the client application is determined from the comparison not to be authorized to fully render the web page.

13. The system of claim 11, where the identity information of the client application comprises an identity of the developer or publisher the client application.

14. The system of claim 11, where the authorization information comprises at least one of a whitelist, hard-coded identifier, or a blacklist.

15. The system of claim 11, where the client application is a Universal Windows Platform (UWP) application; and where the client application logic executing on the first information handling system and from which the identity information of the client application is obtained comprises one or more Windows Runtime (WinRT) application programming interface/s (APIs).

16. The system of claim 11, where the first information handling system is a web server, and where the second information handling system is a desktop or tower computer.

17. A system, comprising:

a first information handling system and a second information handling system;

where the first information handling system comprises a programmable integrated circuit executing to transfer a first portion of a web application across a network to a second information handling system in response to a first request for a web page received across the network from a client application executing on the second information handling system, the transferred first portion of the web application including authorization information; and where the second information handling system comprises a display device and a programmable integrated circuit coupled to the display device, the programmable integrated circuit of the second information handling system executing the first portion of the web application within the client application on the second information handling system and without first fully rendering the requested web page to:

obtain identity information of the client application from client application logic executing on the first information handling system, the identity information of the client application being stored on the first information handling system, compare the identity information of the client application to the authorization information to determine whether or not the client application is authorized to fully render the web page, and fully render the requested web page within the client application on the display device of the second information handling system only if the client application is determined from the comparison to be authorized to fully render the web page; and the programmable integrated circuit of the second information handling system executing the client application logic on the first information handling system to generate a cryptographically random session identifier and storing the generated session identifier on the first information handling system only if the client application is determined to be authorized to fully render the web page, and the providing the session identifier across the network to the second information handling system; and the programmable integrated circuit of the first information handling system executing to store the session identifier on the second information handling system.

18. The system of claim 17, the programmable integrated circuit of the first information handling system executing to respond to a second client application request for a new web page or web page update communicated across the network from the second information handling system during a same web session as the first client application request by transferring a second portion of the web application including the previously-generated session identifier from the first information handling system to the second information handling system;

the programmable integrated circuit of the second information handling system executing the client application logic to:

compare the previously-stored session identifier stored on the second information handling system to the previously-generated session identifier received from the first information handling system to determine whether or not the previously-stored session identifier stored on the second information handling system is the same as the previously-generated session identifier received from the first information handling system, and the programmable integrated circuit of the second information handling system executing the second portion of the web application within the client application and without first fully rendering the requested web page to only one of:

fully render the requested web page update or new web page within the client application on the display device only if the previous session identifier stored on the second information handling system is determined to be the same as the session identifier received from the first information handling system, or display an error message on the display device and not fully render the requested web page only if the previous session identifier stored on the second information handling system is determined not to be the same as the session identifier received from the first information handling system.

19. A method, comprising:

first determining whether an identity of a developer or publisher of a client application within which a static webpage is to be prerendered by a given web application on a display device of a first information handling system is cryptographically signed by signature authority information stored on the first information handling system, the static webpage not enabled to be altered in response to input from a user of the first information handling system;

then creating or editing authorization information on a second information handling system to indicate that the client application is an authorized application within which a dynamic webpage is to be fully rendered by the given web application on the display device of the first information handling system only if the identity of the developer or publisher of the client application is determined to be cryptographically signed by signature authority information, the fully rendered dynamic webpage being enabled to be altered in response to input from the user of the first information handling system.

20. The method of claim 19, further comprising transferring a first portion of the given web application with the authorization information across a network from the second information handling system to a third information handling system in response to a client application request received across a network at the second information handling system from the third information handling system across the network.

* * * * *